Figure 6:
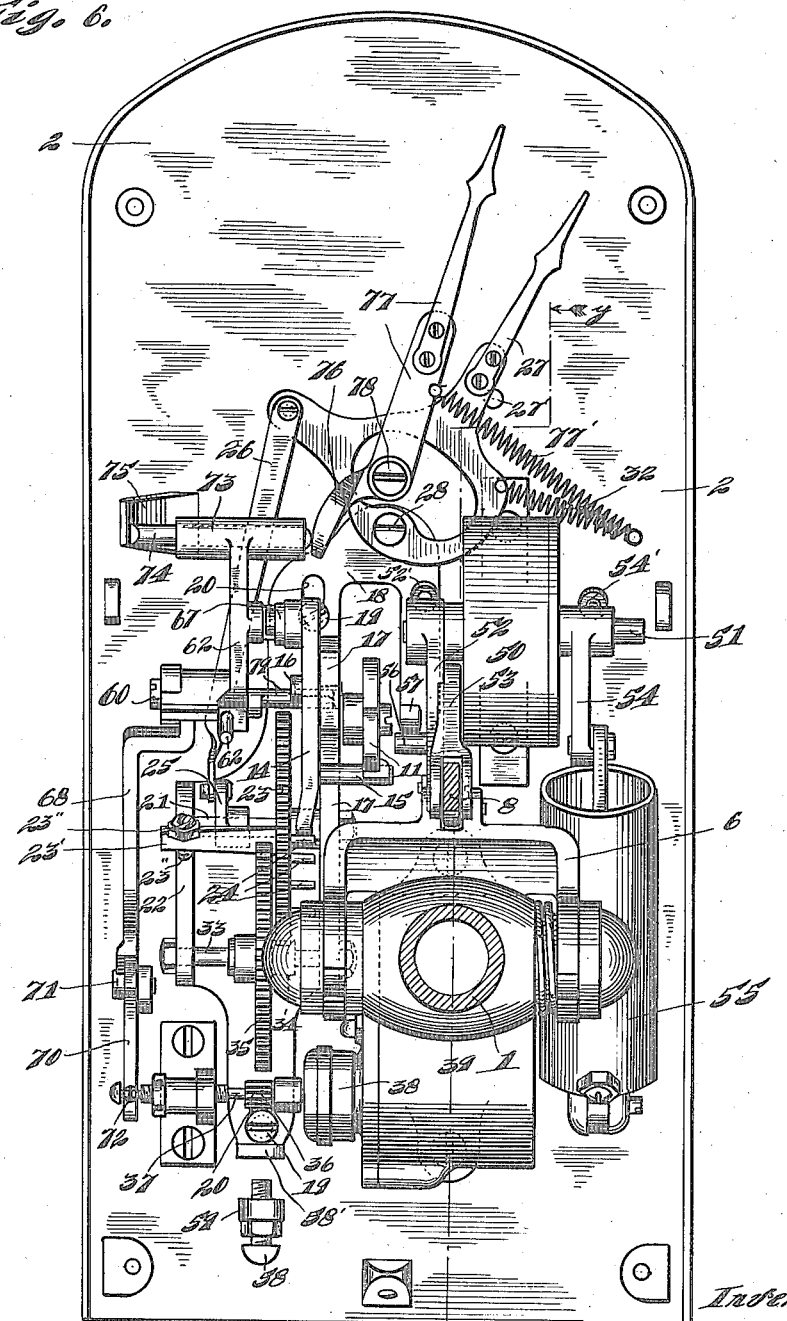

F. SCHORIK & F. F. MARSHALL.
LIQUID MEASURING DEVICE.
APPLICATION FILED NOV. 14, 1913.
1,128,060.
Patented Feb. 9, 1915.
5 SHEETS—SHEET 1.
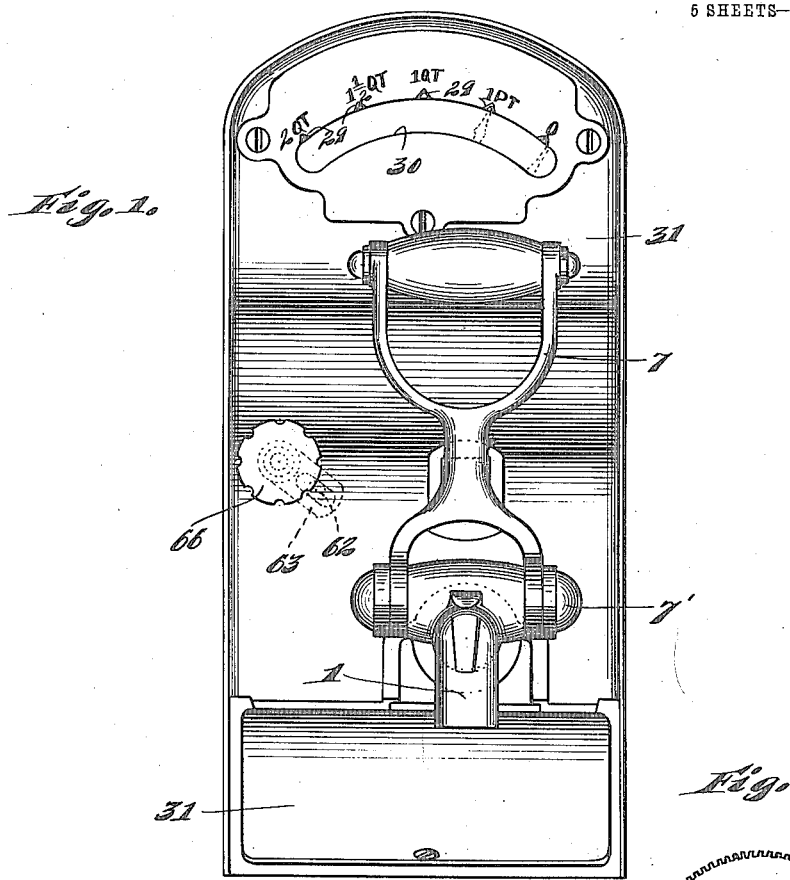
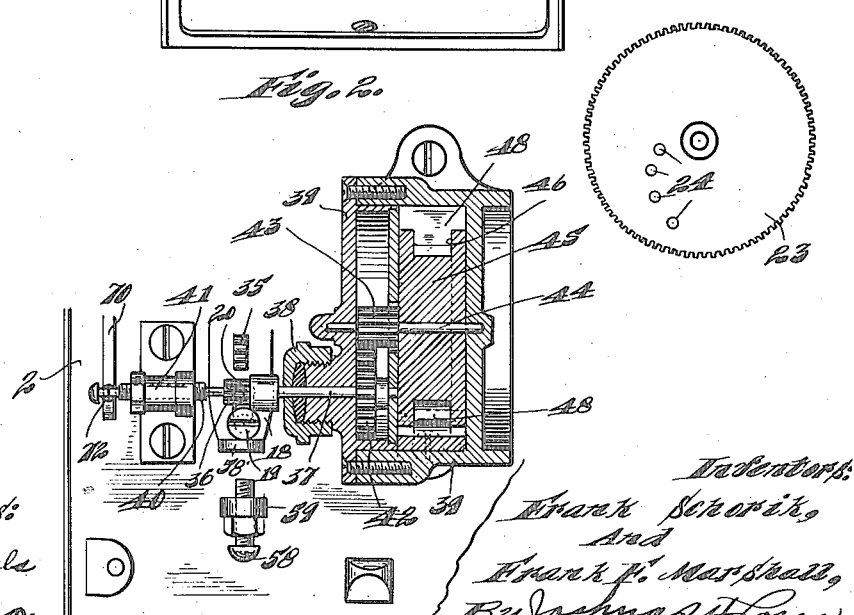

F. SCHORIK & F. F. MARSHALL.
LIQUID MEASURING DEVICE.
APPLICATION FILED NOV. 14, 1913.
1,128,060.
Patented Feb. 9, 1915.
5 SHEETS—SHEET 2.
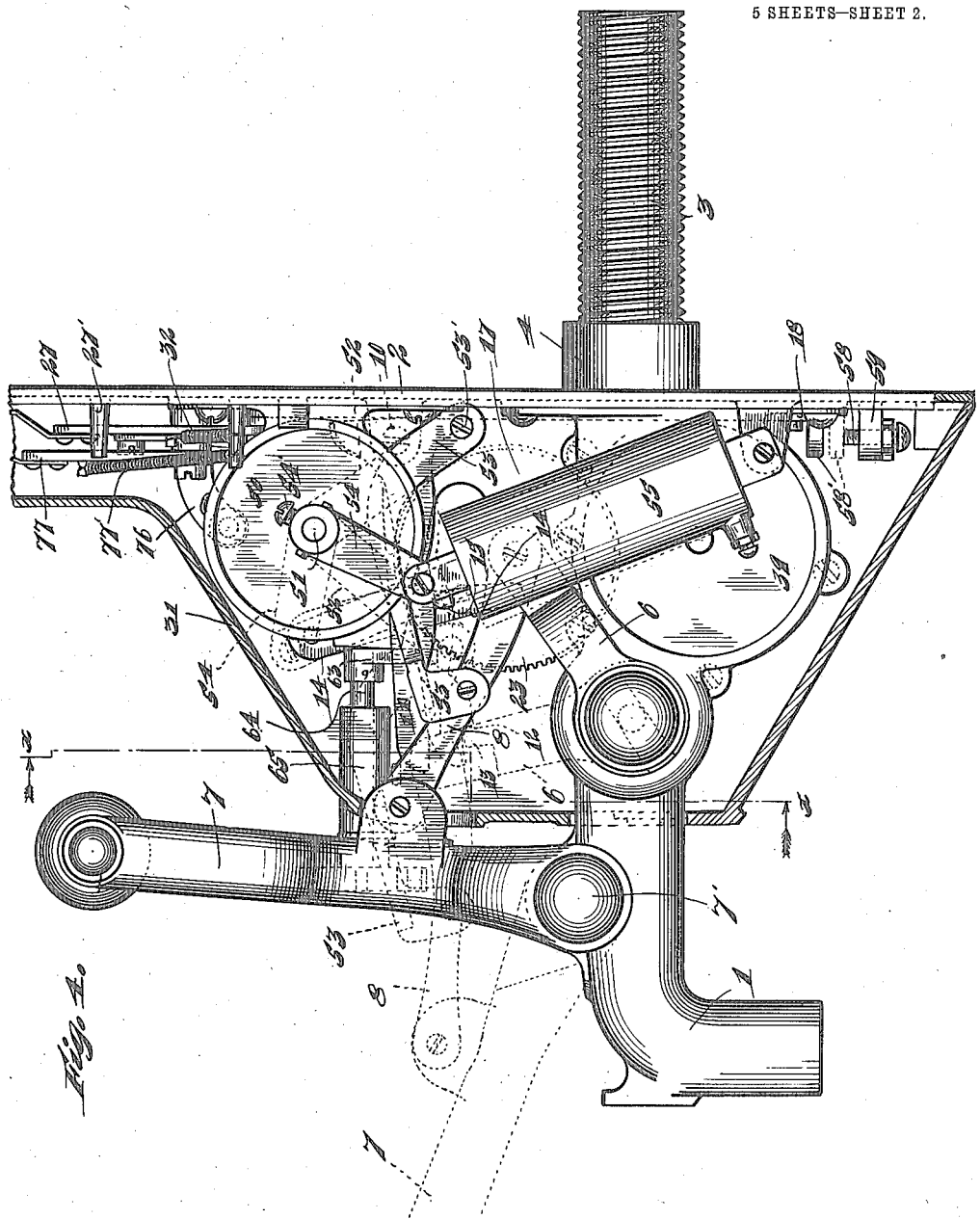

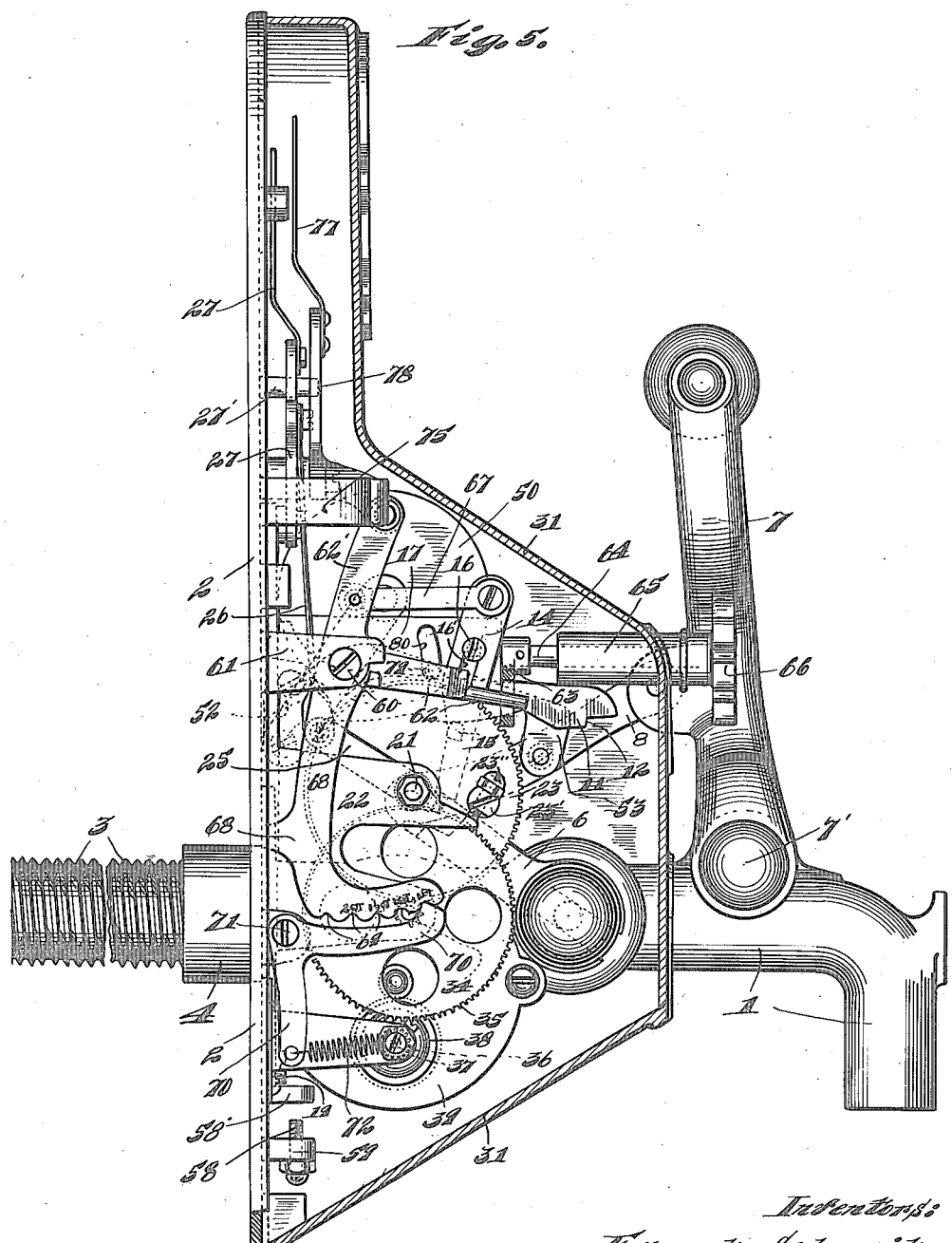

F. SCHORIK & F. F. MARSHALL.
LIQUID MEASURING DEVICE.
APPLICATION FILED NOV. 14, 1913.

1,128,060.

Patented Feb. 9, 1915.
5 SHEETS—SHEET 4.

Witnesses:
C. E. Wessels.
A. A. Olson.

Inventors:
Frank Schorik,
Frank F. Marshall,
By Joshua R. H. Potts
Their Attorney.

F. SCHORIK & F. F. MARSHALL.
LIQUID MEASURING DEVICE.
APPLICATION FILED NOV. 14, 1913.
1,128,060.
Patented Feb. 9, 1915.
5 SHEETS—SHEET 5.
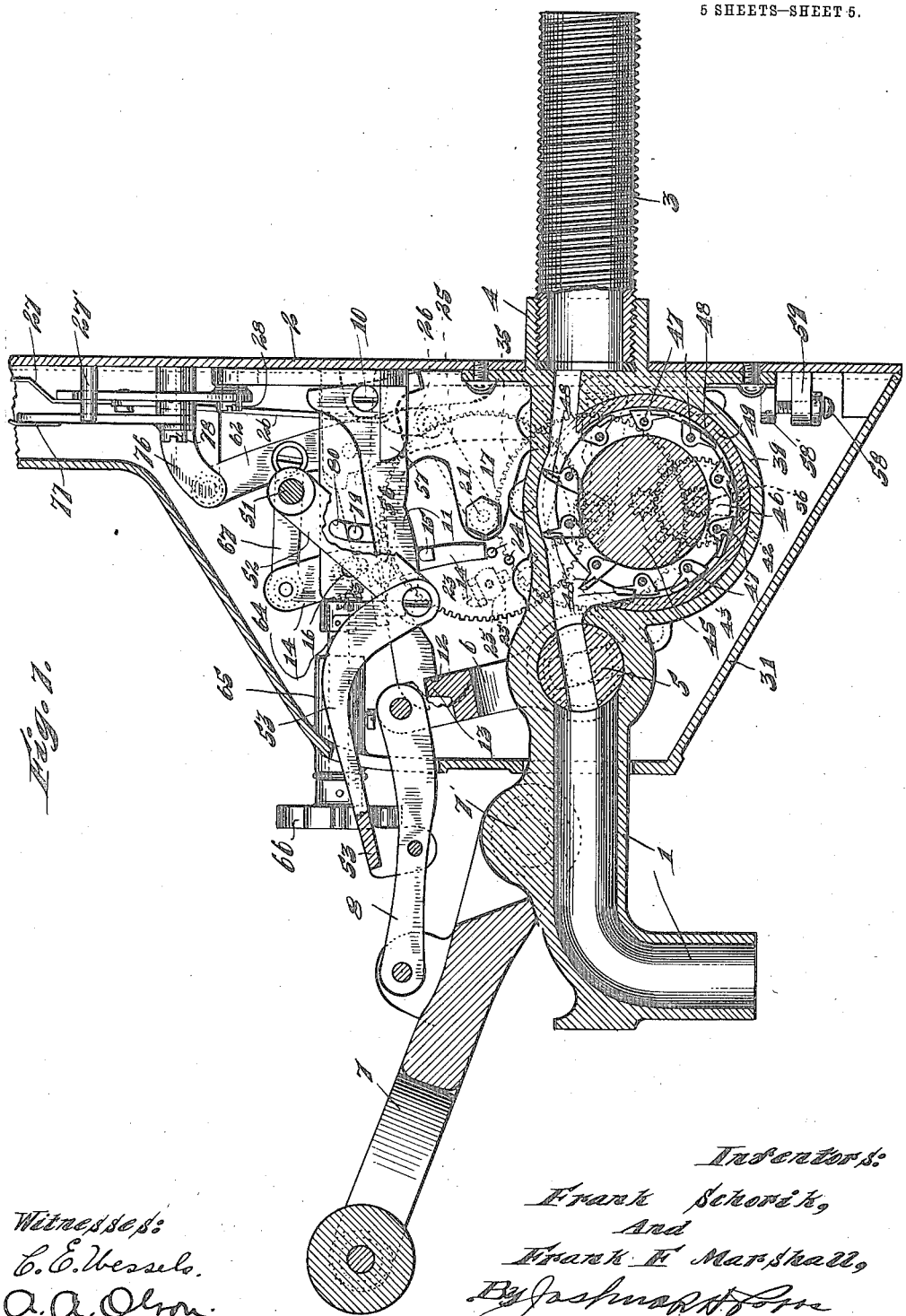
Witnesses:
C. E. Wessels.
A. A. Olson.
Inventors:
Frank Schorik,
And
Frank F. Marshall,
By Jashman
their Attorney.

UNITED STATES PATENT OFFICE.

FRANK SCHORIK AND FRANK F. MARSHALL, OF CHICAGO, ILLINOIS.

LIQUID-MEASURING DEVICE.

1,128,060.            Specification of Letters Patent.        Patented Feb. 9, 1915.

Application filed November 14, 1913. Serial No. 800,956.

*To all whom it may concern:*

Be it known that we, FRANK SCHORIK and FRANK F. MARSHALL, citizens of the United States, and residents of the city of Chicago, county of Cook, and State of Illinois, have invented certain new and useful Improvements in Liquid-Measuring Devices, of which the following is a specification.

Our invention relates to improvements in liquid measuring devices and has for its object the production of a device of this character which will be of durable construction, accurate in operation and efficient in use.

This device is designed for use especially in saloons or other places where beer or other liquid is dispensed, the purchaser supplying a pail or bucket into which the liquid is poured. At the present time in saloons, especially, the bartender, after opening the faucet is required to remain at the same until the desired amount has been drawn, and then to shut off the faucet. Also, at the present time, no means is provided for accurately measuring the liquid dispensed, the bartender being required to trust to his judgment.

It is the object of the present invention to provide a measuring device which may be adjusted to measure any quantity desired, and which will be adapted, after adjustment and when opened, to automatically shut itself off when the desired quantity of liquid has been discharged therefrom.

With these objects in view the invention consists in the combinations and arrangements of parts hereinafter described and claimed.

The invention will be best understood by reference to the accompanying drawings forming a part of this specification, and in which, Figure 1 is a front elevation of a liquid measuring device embodying our invention, Fig. 2 is an enlarged detail fragmental section illustrating the construction of the water wheel included in the invention and adjacent portions of the construction, Fig. 3 is a detail side elevation of one of the gear wheels of the device, Fig. 4 is a side elevation of the device, the housing thereof being broken away and shown in section in order to expose underlying parts, Fig. 5 is a view similar to Fig. 4 viewing the device from the opposite side, Fig. 6 is a section taken on substantially line x—x of Fig. 4, and Fig. 7 is a section taken on line y—y of Fig. 6.

The preferred form of construction as illustrated in the drawings comprises a faucet 1 which is secured to and which projects from a plate 2, the latter when the device is in use, being adapted for fastening upon any suitable support at any location desired. The rearward end of the faucet 1 communicates with a threaded pipe connection 3, which is threaded at its forward end in a nipple 4 formed at the rearward end of said faucet, the connection 3 being adapted, when the device is in use, for connection with a supply pipe which communicates with any suitable source of liquid supply.

The passage through the faucet 1 is controlled by a rotatably mounted valve 5 of any approved design, operation of said valve being effected by an upwardly extending arm 6. The arrangement is such, that, when the arm 6 is in a rearwardly tilted position or at its rearward terminal of oscillation, as shown in Fig. 4, the valve 5 will be closed, and when said arm is in a substantially vertical position, or at its forward terminal of oscillation, as shown in Fig. 7, said valve will be opened.

Fulcrumed at 7' upon the faucet 1 is a handle 7 which is operatively connected with the operating arm 6 of the valve 5 by means of a link 8, said handle, when the device is in use, being adapted for manual engagement in swinging the arm 6 to its forward terminal of oscillation in order to move the valve 5 to open position.

Pivoted at 10 to the plate 2, as shown in Fig. 7, is a forwardly projecting detent 11 provided at its forward or free end with a shoulder 12 adapted to engage with an ear or lug 13 provided upon the upper free end of the arm 6, to releasably hold said arm at its forward terminal of oscillation, and hence the valve 5 in opened position. The arrangement is such, that the under side of the detent 11 remains constantly in engagement with said lug, said lug sliding in contact with said under side or edge of said detent upon oscillation of said arm and so that, when said arm is moved to its forward terminal of oscillation, the shoulder 12 of said detent will automatically drop into position behind said lug to releasably hold said arm in this position.

Tripping of the detent 11 in order to effect release of the arm 6 is secured through the medium of a substantially vertically disposed trigger 14 which is provided adjacent its lower end, with a laterally projecting pin 15 adapted for engagement with the under side of said detent, as shown in Fig. 7, the arrangement being such that, when said trigger is moved vertically, said pin 15 will engage against said detent and rock the same upwardly to releasing position. Said trigger is pivotally secured by means of a screw 16 to a flange or arm 17 which projects forwardly from a flat member or plate 18 slidably mounted for slight vertical movement upon the front side of base plate 2, the member 18 being secured to said plate 2 by means of screws 19 which engage elongated slots 20, as clearly shown in Fig. 6. The screw 16 engages an elongated slot 16' provided in the trigger 14 so as to permit of vertical movement of the latter, as is required in the tripping operation thereof as above mentioned.

Fixed upon a stud shaft 21 whose ends are rotatably mounted in the flange 17 and a second flange 22 projecting forwardly from the member 18, as clearly shown in Fig. 6, is a gear 23. Said gear 23 is provided at one side with a plurality of pins 24 which project therefrom. There are a number of pins 24 which are arranged at varying distances from the center of rotation of said gear and spaced circumferentially thereon, as clearly shown in Fig. 3. The lower end of the trigger 14 is positioned for contact with any one of said pins 24 whereby, upon positive rotation of said gear, contact of any one of said pins with said lower end of said trigger will effect elevation of the latter to cause tripping of the detent 11, as will be readily understood. Through the provision of a plurality of said pins 24 arranged as described, it will be seen that by adjusting the trigger so that the lower end thereof will contact with a certain one of said pins, the duration of the interval at the expiration of which said trigger will be actuated by said gear, in the rotation of the latter from a fixed position, may be varied, it being clear that by spacing said pins circumferentially upon said gear, the same will reach their operative positions relative to the lower extremity of the trigger successively, the pin which is closest to the center of the gear, being adapted to first reach its operative position relative to the trigger, and the pin adjacent the periphery of said disk being the last to reach its operative position upon rotation of said gear. Therefore, with this arrangement, it will be seen that, through pivotal adjustment of trigger 14, the device will be adapted to measure various quantities of liquid, said pins in practice, being so positioned that the tripping of the detent effected thereby, will occur when a predetermined quantity of liquid has passed through the faucet, for instance, one pint will have been measured when the first pin reaches its operative position, one quart when the second pin reaches its operative position, three pints when the third pin reaches its operative position relative to the trigger 14, and so on.

Fixed to the shaft 21 of gear 23, as shown in Fig. 5, is a rearwardly projecting rocker arm 25 with which is pivotally connected the lower end of a link 26, the upper end of said link being connected, as shown in Fig. 6, with an indicator 27 which is hingedly mounted at 28 upon the member 18. The arrangement is such, as will be observed, that said indicator 27 will rock simultaneously with the rotation of the gear 23 and will serve to progressively indicate the amount of liquid discharging from the device during operation thereof. In this indication by the indicator 27, the same coöperates with graduations 29 which are provided, as shown in Fig. 1, at the upper edge of an arcual sighting opening 30 forming in a housing 31 which incloses the entire mechanism, being secured to the plate 2, as shown in the several views. The indicator 27 may be viewed through the opening 30 and together with the indications 29 will progressively indicate, as mentioned, the quantity of the liquid which is discharged from the device in operating. A helical tension spring 32 coöperates with the indicator 27 to normally hold the same in its zero position, or in engagement with a stop 27' which projects from the plate 2. Said spring 32 serves also, as will be understood, to normally hold the gear 23 in initial or starting position which is determined by a stop arm 23' which projects laterally from said gear, the outer end of said arm being provided with a stop screw 23'' which is adapted to contact with an extension at the outer end of flange 22 of the plate 18, as clearly shown in Fig. 5. Also mounted in the flanges 17 and 22 of the member 18, as shown in Fig. 6, is a stud-shaft 33 upon which is fixed a pinion 34 which meshes with the gear 23. Also fixed to the shaft 33, is a gear 35 adapted to mesh with a pinion 36 fixed to a shaft 37 mounted at its inner end in a packed bearing 38 in water wheel housing 39 provided at the under side of the faucet 1, the outer end of said shaft being mounted in a bearing 40 which is threaded for adjustment in a support 41 secured to the plate 2, as shown in Fig. 2. The inner end of the shaft 37 carries a gear 42 which meshes with a pinion 43 fixed to the shaft 44 of the water wheel proper, an operative connection being thus established between the water wheel and the tripping mechanism of the detent 11. Said water wheel comprises a circular body 45 which fits snugly in the housing 39, as clearly shown in Fig. 2, the periphery thereof being provided with an annular groove 46. Pivoted at 47 to the periphery of the wheel body 45 is a plurality of vanes 48, said vanes having central lugs which snugly engage the groove 46 in said water wheel body, as clearly shown in Figs. 2 and 7. The upper side of the water wheel registers with the passage through the faucet 1 and said vanes 48 are so mounted that, when the same are registering with said faucet passage, the force of the liquid flowing through said passage thereon will cause said vanes to rock to positions, as shown in Fig. 7 in which the same completely traverse the passage through the faucet and the groove 46 in the water wheel body. Provided in the lower end of the housing 39 is a segmental strap 49 with which said vanes contact after the same move from registration with the faucet passage, to be rocked into snug engagement with the periphery of the water wheel body so as to effectually close the passage around the under side of the water wheel, and thereby prevent leakage past the water wheel in operation. A water wheel of this construction is very accurate, it having been found through experiment, that in use a predetermined quantity will be measured thereby at each rotation thereof, and so that with this arrangement it becomes possible to regulate the position of the pins 24 upon the gear 23, so as to be moved into operative relation with the trigger after a predetermined number of rotations of said water wheel, and hence after a predetermined quantity of liquid has passed through the device.

Coöperating with the handle 7 is a helical torsional spring housed in a housing 50 which is secured upon the front side of the plate 2. As shown in Fig. 4 said spring is connected with a rock shaft 51 mounted in the housing 50, to one end of which is fixed a rocker arm 52. The free end of said rocker arm is pivotally connected at 53' with one end of a link 53, the opposite end of said link being pivotally connected with the link 8 which connects the arm 6 and handle 7. Said spring is adapted normally to hold the handle 7 in vertical position and hence the valve 5 in closed position and is adapted, upon release of said arm by the detent 11, as above described, to immediately rock said arm rearwardly and consequently valve 5 to closing position. A dash pot 55 coöperates with the handle 7, being connected with a rocker arm 54 which is secured to the opposite end of the torsional spring shaft 51, the rocker arms 52, and 54 being secured to said shaft by set screws 52' and 54' respectively. Said dash pot is adapted to absorb shocks which would be incident to the rapid return of handle 7 to closing position under the influence of the returning mechanism, just mentioned.

Carried at the free end of the rocker arm 52 is a laterally projecting lug or pin 56 as clearly shown in Fig. 6 adapted, when the arm 52 is in its normal position, that is with the faucet valve in closed position, to engage against the under side of a forwardly projecting lug 57 provided upon the member 18 in order to cause the latter to be elevated so as to disengage the gear 35 from the pinion 36. With this arrangement then, it will be seen that, in the operation of the device, when the detent 11 is tripped, and the faucet valve is moved to closing position, said lug or pin 56 will move rearwardly and upwardly into engagement with the lug 57 of the member 18, causing the latter to be elevated and thereby break the operative connection between the water wheel and the gear 35 and the mechanism operatively connected with said gear, so as to permit of the gear 23 being oscillated under the influence of spring 32 to its initial or starting position. Also, with this arrangement, it will be seen, that said operative connection between the tripping mechanism and the water wheel will remain broken until the faucet valve is opened, in which event the pin 56 will be moved from engagement with the lug 57, permitting of the member 18 dropping downwardly by gravity so as to effect meshing of the gear 35 with the pinion 37, thus establishing operative connection between the water wheel and the tripping mechanism the instant the faucet valve is opened. Downward movement of the member 18 is limited by a stop screw 58 which is threaded in a lug 59 projecting forwardly from the plate 2, said stop screw being adapted for engagement with a lug 58'' which projects forwardly from the lower end of said member 18, as clearly shown in Fig. 4.

Hinged at 60 to a lug 61 which projects forward from the plate 2, is a bell crank lever 62—62', as shown in Fig. 5. The forward end of the arm 62 of said bell crank lever engages an elongated slot provided in a rocker arm 63 fixed to the inner end of a rocker shaft 64 mounted in a bearing 65 provided in the housing 31. The forward end of the shaft 64 is provided with a hand wheel 66 adapted for manual engagement in order to rock said shaft and hence the bell crank lever 62—62'. The arm 62'' of said bell crank lever is connected by means of a link 67 with the upper end of the trigger 14, and so that upon rocking of said bell crank, said trigger will be simultaneously rocked to adjust the lower end thereof relative to the pins 24 upon gear 23. With this arrangement then, it will be seen, that pivotal adjustment of the trigger 14 in order to position the same for engagement by any one of the pins 24, or more precisely in order to set the device to automatically shut off after a predetermined quantity of liquid has passed therethrough, may be effected, by manipulation of the hand wheel 66. The bell crank lever 62—62″ is provided with a depending or angular arm 68 the under side of the lower forwardly projecting portion of which is provided with a plurality of notches 69 adapted for engagement by a dog 70 hinged at 71, as shown in Fig. 5. A tension spring 72 coöperates with said dog to normally press the upper end thereof into engagement with the notches 69, this arrangement being simple and effective means for yieldingly holding the trigger 14 in any position to which the same may be adjusted by the hand wheel 66, the notches 69 corresponding with the pins 24 of the gear 23. Provided at the upper end of the arm 62 of said bell crank lever is a bearing 73 having a transversely extending pin 74 mounted for free longitudinal movement in said bearing, as shown in Fig. 6. One end of said pin 74 engages against an inclined lug 75 which projects forwardly from the plate 2, the opposite end of said pin contacting with a lug 76 depending from the lower end of an indicator 77 which is pivoted at 78 upon said plate 2. A helical tension spring 77′ coöperates with said indicator to normally hold the lug 76 thereof in engagement with the pin 74 and, indirectly to hold said pin in engagement with the inclined lug 75. The arrangement is such, as will be observed that, upon tilting of the bell crank lever 62—62″ through manipulation of the hand wheel 66, the pin 74 being moved relative to the inclined lug 75, will be caused to move longitudinally by reason of its contact with said lug, and thus effect tilting of the indicator 77, it being clear that when the upper end of said bell crank lever is rocked toward the plate 2, said pin will be moved to the right causing rocking of the upper end of the indicator 77 to the left, and when said end of said bell crank lever is rocked forwardly or from said plate, the spring 77′ will operate to rock said indicator to the right, and which in turn causes longitudinal movement of the pin 74 to the left. The arrangement is such, that the indicator 77 coöperating with the graduations 29 upon the front side of housing 31, will serve to indicate the position of the trigger 14 and so that, in the operation of the machine the latter may be set to measure the quantity of liquid desired by simply adjusting the hand wheel 66 to position the indicator 77 at the graduation corresponding with that amount. The forward end of the arm 62 of the bell crank lever 62—62″ is provided with a laterally projecting pin 79 which engages an arcual slot 80 formed in the flange 17, said pin and slot serving as a stop to limit the amplitude of oscillation of said bell crank lever in the operation thereof.

With a device then of the construction set forth, when it is desired to operate the same it is first required, after determining the quantity or amount of liquid it is desired to draw, to adjust the hand wheel 66 in order to position the indicator 77 to indicate such amount. After this adjustment, the handle 7 is rocked forward causing opening of the valve 5. Said valve will be held in open position by the detent 11 which will automatically move into engagement with the lug 13 of the arm 6 when said valve is in fully opened position. Immediately upon forward swinging of the arm 6, such movement thereof being effected upon rocking of the handle 6 to open position, the pin 56 will move from engagement with the lug 57 of the member 18 so as to permit of slight downward movement of the latter. This movement of said member causes engagement of the gear 35 with the pinion 37, so that, upon rotation of said pinion such as is imparted thereto through rotation of the water wheel, which is operated by the passage of liquid through the faucet, said gear, and hence the gear 23 provided with the pins 24, will be caused to positively rotate, carrying said pins 24 toward the lower extremity of trigger 14. When the desired quantity of liquid has flowed through the faucet, one of said pins 24 will contact with the lower end of trigger 14 and cause upward movement of the latter to effect tripping of the detent 11. Upon tripping of said detent, the arm 6 and handle 7, and hence the valve 5 will be moved to closing position under the influence of the torsional spring housed in housing 50. The indicator 27 which is operatively connected with the gear 23 will be rocked by said gear to progressively indicate the quantity of liquid which is discharged, the tripping of the detent to cause closing of the valve occurring when said indicator 27 registers with the indicator 77.

The indicator 27 serves to indicate at all times the quantity of liquid discharged and also by its return movement simultaneously with the closing of the valve, serves to notify the operator of this condition of the valve. Furthermore, indicator 27 being operatively connected with the water wheel, will serve to indicate the operative condition of said water wheel since, with this arrangement, in the event of said water wheel getting out of order and which would result in an uneven or interrupted rotation thereof, the usual, even, uniform movement of said indicator will be correspondingly interrupted and thus serve to advise the operator or attendant of the fact.

With the mechanism then as described, it will be seen that in use it is only required to adjust the mechanism to the amount of liquid it is desired to draw, and then to open the valve, the closing of the valve after the desired quantity of liquid has flowed through the faucet, being automatically effected.

While we have illustrated and described the preferred form of construction for carrying our invention into effect, this is capable of variation and modification without departing from the spirit of the invention. We, therefore, do not wish to be limited to the exact details of construction set forth, but desire to avail ourselves of such variations and modifications as come within the scope of the appended claims.

Having described our invention what we claim as new and desire to secure by Letters Patent is:

1. A liquid measuring device comprising a faucet having a controlling valve therein; means for yieldingly holding said valve normally in closed position; a detent adapted to releasably hold said valve in open position; means operable by the passage of liquid through said faucet for tripping said detent to release said valve, said last mentioned means being adjustable whereby said detent may be tripped when various predetermined quantities of liquid have passed through said faucet; an indicator; an operative connection between said indicator and said last mentioned means whereby, said indicator will be adjusted simultaneously with said means to indicate the quantity of liquid after the passage of which through the faucet, said detent will be tripped; and a second indicator operatively connected for movement toward said first mentioned indicator to progressively indicate the quantity of liquid discharging from said faucet, substantially as described.

2. A liquid measuring device comprising a faucet having a controlling valve therein; means for yieldingly holding said valve normally in closed position; a detent adapted to releasably hold said valve in open position; means operable by the passage of liquid through said faucet for tripping said detent to release said valve, said last mentioned means being adjustable whereby said detent may be tripped when various predetermined quantities of liquid have passed through said faucet; a pivotally mounted indicator; an operative connection between said indicator and said last mentioned means whereby said indicator will be rocked simultaneously with the adjustment of said means to indicate the quantity of liquid after the passage of which through the faucet, said detent will be tripped; a second indicator pivotally mounted and operatively connected for movement toward said first mentioned indicator to progressively indicate the quantity of liquid discharging from said faucet; and graduations arranged for coöperation with said indicators, substantially as described.

3. A liquid measuring device comprising a faucet having a controlling valve therein; means for yieldingly holding said valve normally in closed position; a detent adapted to releasably hold said valve in open position; rotatable means operable by the passage of liquid through said faucet; adjustable means operatively connected with said last mentioned means for tripping said detent to release said valve; a tiltable lever for adjusting said tripping means to effect tripping of said detent when various predetermined quantities of liquid have passed through said faucet; a pivotally mounted indicator; and means on said lever engaging said indicator whereby said indicator will be adjusted simultaneously with said tripping means to indicate the quantity of liquid after the passage of which through the faucet, said detent will be tripped, substantially as described.

4. A liquid measuring device comprising a faucet having a controlling valve therein; means for yieldingly holding said valve normally in closed position; a detent adapted to releasably hold said valve in open position; rotatable means operable by the passage of liquid through said faucet; adjustable means operatively connected with said last mentioned means for tripping said detent to release said valve; a tiltable lever for adjusting said tripping means to effect tripping of said detent when various predetermined quantities of liquid have passed through said faucet; a pivotally mounted indicator; a transversely extending movably mounted pin carried by said lever and engaging against said indicator for rocking the latter in one direction; and a spring for rocking the same in the other direction whereby said indicator will be adjusted simultaneously with said tripping means to indicate the quantity of liquid after the passage of which through the faucet, said detent will be tripped, substantially as described.

5. A liquid measuring device comprising a faucet having a controlling valve therein; means for yieldingly holding said valve normally in closed position; a detent adapted to releasably hold said valve in open position; rotatable means operable by the passage of liquid through said faucet; adjustable means operatively connected with said last mentioned means for tripping said detent to release said valve; a tiltable lever for adjusting said tripping means to effect tripping of said detent when various predetermined quantities of liquid have passed through said faucet; a pivotally mounted indicator; a transversely extending pin movably mounted in said lever, one end of said pin engaging against a stationary inclined surface, the opposite end of said pin engaging against said indicator; and a spring for yieldingly holding said indicator in engagement with said pin and for holding said pin in engagement with said inclined surface whereby, upon oscillation of said lever, said pin will be moved longitudinally to effect rocking of said lever, and whereby said indicator will be adjusted simultaneously with said tripping means to indicate the quantity of liquid after the passage of which through the faucet, said detent will be tripped, substantially as described.

6. A liquid measuring device comprising a faucet having a controlling valve therein; means for yieldingly holding said valve normally in closed position; a detent adapted to releasably hold said valve in open position; rotatable means operable by the passage of liquid through said faucet; adjustable means operatively connected with said last mentioned means for tripping said detent to release said valve; a tiltable lever for adjusting said tripping means to effect tripping of said detent when various predetermined quantities of liquid have passed through said faucet; a pivotally mounted indicator; means on said lever engaging said indicator whereby said indicator will be adjusted simultaneously with said tripping means to indicate the quantity of liquid after the passage of which through the faucet, said detent will be tripped; and a spring pressed dog engaging a notched surface on said lever for yieldingly locking said lever in positions of adjustment, substantially as described.

7. A liquid measuring device comprising a faucet having a controlling valve therein; means for yieldingly holding said valve normally in closed position; a detent adapted to releasably hold said valve in open position; a trigger for tripping said detent; a movably mounted member; a gear rotatably mounted in said member; means on said gear adapted, when said gear is rotated in one direction, to actuate said trigger; a second gear also rotatably mounted in said movable member meshing with said first mentioned gear; means operable by the passage of liquid through said faucet for rotating said second mentioned gear, vertical movement of said movable member effecting breaking of the operative connection between said gear and said operating means; means for vertically moving said movable member upon tripping of said detent and movement of said valve to closing position; a pivotally mounted indicator; and an operative connection between said indicator and one of said gears whereby, said indicator will progressively indicate the quantity of liquid discharging from said faucet, substantially as described.

In testimony whereof we have signed our names to this specification in the presence of two subscribing witnesses.

FRANK SCHORIK.
FRANK F. MARSHALL.

Witnesses:
    JOSHUA R. H. POTTS,
    B. G. RICHARDS.